United States Patent
Ku

(10) Patent No.: US 6,262,605 B1
(45) Date of Patent: Jul. 17, 2001

(54) AUTOMATED LINE DRIVER CONTROL CIRCUIT FOR POWER MANAGED SYSTEM

(75) Inventor: Yi-Ming Ku, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,186

(22) Filed: May 6, 1999

(51) Int. Cl.$^7$ ................................ H03B 1/00; H03K 3/00
(52) U.S. Cl. ..................... 327/108; 327/544; 326/56; 326/82
(58) Field of Search ................ 327/108–112, 544, 327/374–377, 379; 326/56–58, 81–84, 85, 87, 21, 30

(56) References Cited

U.S. PATENT DOCUMENTS

| | | | |
|---|---|---|---|
| 4,963,766 | * 10/1990 | Lundberg | 326/58 |
| 5,021,683 | * 6/1991 | Schemmel | 326/56 |
| 5,650,672 | * 7/1997 | Curd | 307/130 |
| 5,777,496 | * 7/1998 | Herman | 327/108 |
| 5,778,235 | * 7/1998 | Robetson | 395/728 |
| 5,825,215 | * 10/1998 | Sugio et al. | 327/108 |
| 5,929,654 | * 6/1999 | Park et al. | 326/58 |
| 6,070,211 | * 5/2000 | Neal et al. | 710/106 |
| 6,073,198 | * 6/2000 | Meyer et al. | 710/110 |
| 6,144,251 | * 11/2000 | Ogawa | 327/544 |

* cited by examiner

*Primary Examiner*—Terry D. Cunningham
*Assistant Examiner*—Long Nguyen
(74) *Attorney, Agent, or Firm*—Joseph P. Lally; Leslie A. Van Leeuwen

(57) ABSTRACT

A driver circuit for use in a system that includes first, second, and possibly more power supplies. The driver circuit includes a first line driver with an output connected to a first receiver circuit and a second line driver with an output connected to a second receiver circuit. A first output enable control circuit is connected to an output enable of the first line driver. The first power supply provides an input to the output enable control circuit such that the state of the first line driver output enable is a function of the first power supply. In one embodiment, the first receiver circuit is powered by the first power supply and the second receiver circuit is powered by the second power supply. In one embodiment, the first power supply is the Vcc power supply of the system and the second power supply is the Vccsb (vcc standby) power supply of the system. In the preferred embodiment, the first output enable assumes a high impedance state when the first power supply is off and the second output enable is independent of the first power supply.

15 Claims, 5 Drawing Sheets

AUTOMATED LINE DRIVER CONTROL CIRCUIT FOR POWER MANAGED SYSTEM

BACKGROUND

1. Field of the Present Invention

The present invention generally relates to the field of power management in an electronic system and more particularly to the circuit and method for controlling line drivers in a system with multiple power modes.

2. History of Related Art

Electronic systems including computer systems are frequently designed with a multiple power supply scheme to permit multiple power mode operation. Multiple power modes enable the system to assume one of two or more power states depending upon various factors. In one example familiar to many users of computer systems, portions of the computer system including disk drives, display screens, and possibly an attached printer will be effectively turned off if the devices has not detected any recent activity. Low power modes beneficially reduce power consumption and preserve or extend the useful life of system components by decreasing the amount of thermal stress to which the components are subjected. Semiconductor components, for example, are susceptible to failure or breakdown from sustained thermal stress. Moreover, there is a direct relationship between the power consumed by a semiconductor device and the temperature of the device. For these reasons, it is highly desirable to design the system that consumes the lowest possible power consumption in its low power mode. Unfortunately, it is not uncommon to have a low power mode portion of a system connected to another portion of the system that is not operating in low power mode. This arrangement can lead to undesirable results in the form of increased low power mode current and possibly even damaged components when an output driver or line driver of the preceding stage remains powered while power is terminated to the driven stage. Accordingly, it would be highly desirable to implement an elegant yet practical solution to managing line drivers in a power managed system.

SUMMARY OF THE INVENTION

Broadly speaking, the invention contemplates a driver circuit for use in a power managed system. The system includes first, second, and possibly more power supplies. The driver circuit includes a first line driver with an output connected to a first receiver circuit and a second line driver with an output connected to a second receiver circuit. A first output enable control circuit is connected to an output enable of the first line driver. In the preferred embodiment, the first output enable assumes a high impedance state when the first power supply is off and the second output enable is independent of the first power supply. The first power supply provides an input to first output enable control circuit such that the state of first line driver output enable is a function of the first power supply. In one embodiment, the first receiver circuit is powered by the first power supply and the second receiver circuit is powered by the second power supply. In one embodiment, the first power supply is the Vcc power supply of the system and the second power supply is the Vccsb (Vcc standby) power supply of the system. In one implementation, the driver circuit is comprised of a gate array. In this embodiment, the gate array may further include an output enable register. Each bit of the output enable register corresponds to a respective line driver of the driver circuit and the state the output enable of the respective line driver is a function of the corresponding output enable register bit. In one arrangement, for example, the output enable register bit determines whether the output enable of the corresponding line driver is a function of the Vcc power supply (i.e., whether turning off the Vcc power supply tri-states the line driver output stage).

The invention further contemplates a computer system that includes the driver circuit described above. The computer system would include first and second power supplies, a CPU connected to a host bus, a one or more bus bridges coupled between the host bus and a peripheral bus, such as an ISA bus. In one arrangement, the driver circuit is coupled to and accessible from the peripheral bus. The computer system may further include a service processor powered the Vccsb power supply of the system. The service processor is preferably coupled to the driver circuit via a service processor bus such as a Motorola 68000 type bus. The driver circuit may be implemented as a field programmable gate array accessible to both the CPUs and the service processor. The gate array may include an output enable register that controls which of the line drives should be tri-stated when the system enters standby mode. In this embodiment, the service processor may configure the line drivers when the system is booted.

The invention further contemplates a control method for use in a power managed system. Initially, the voltage of a Vcc power supply of the system is detected. In response, an output enable of a first line driver is controlled by a first output enable control circuit whose output depends upon or is a function of the voltage of the Vcc power supply. The output of the first line driver is preferably connected to a first receiver circuit that is powered by the Vcc power supply. In addition, an output enable of a second line driver is controlled by a second output enable control circuit whose output is independent of the Vcc power supply voltage. In the preferred embodiment, detecting the voltage of the Vcc power supply is accomplished by routing the Vcc power supply to the input of a first output enable control circuit. Controlling the first output enable preferably comprises forcing the first line driver output stage to a high impedance condition when the first power supply is off. In the preferred embodiment, the first receiver circuit is powered by the Vcc power supply and the second receiver circuit is powered by a Vccsb power supply.

BRIEF DESCRIPTION OF THE DRAWINGS

Other objects and advantages of the invention will become apparent upon reading the following detailed description and upon reference to the accompanying drawings in which.

Figure 1:
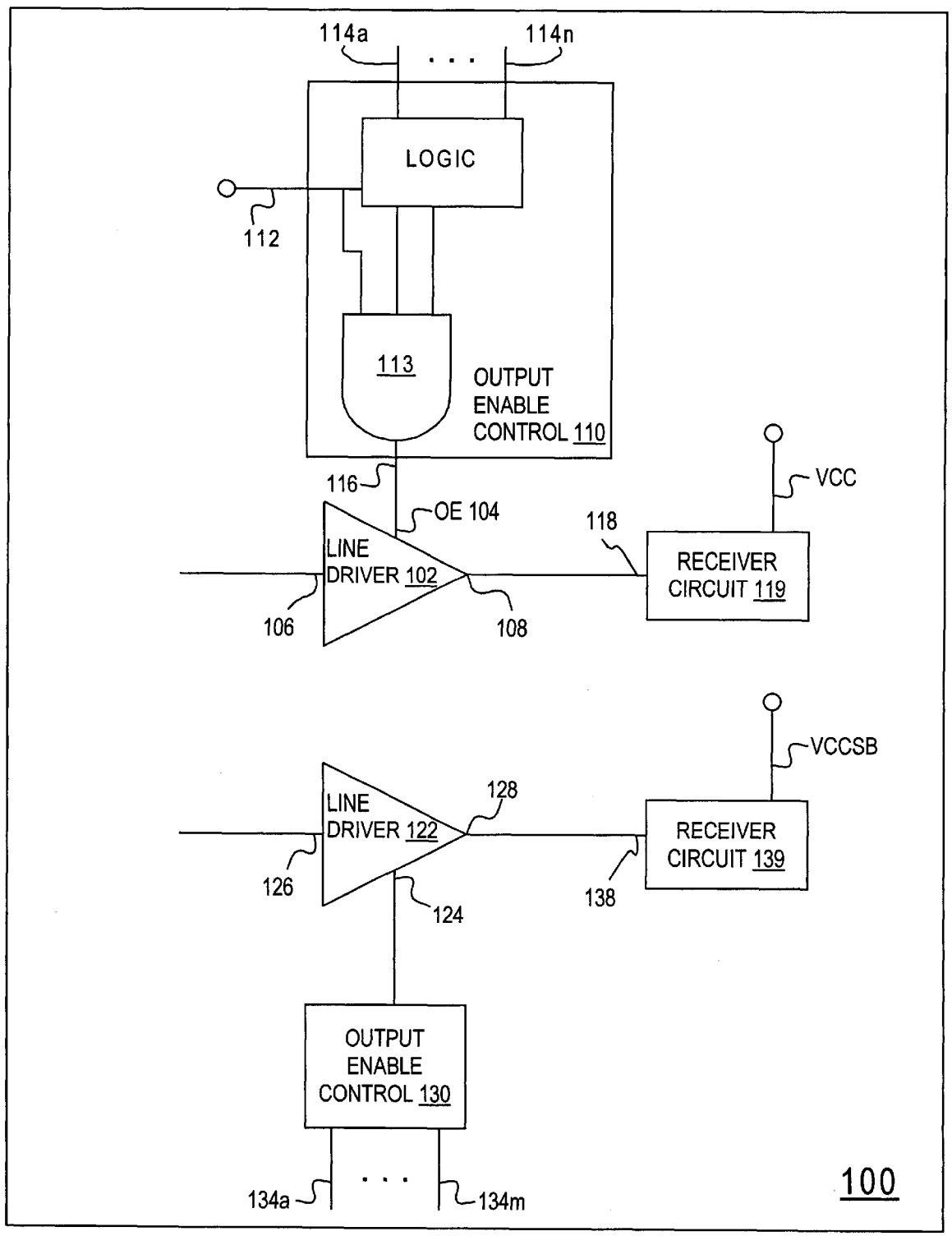
FIG. 1 is a simplified block diagram of a driver circuit according to a one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts an embodiment of a driver circuit 100 according to the present invention. Driver circuit 100 is preferably used in a power managed system such as a computer system. For purposes of this disclosure, a powered managed system is defined as a system employing multiple power supplies that power different portions of the system to enable a low power mode by turning off one or more of the supplies. As depicted in FIG. 1, driver circuit 100 includes a first line driver 102 and a second line driver 122. Line drivers, also commonly referred to as buffers, enable a digital signal, such as an output from a standard TTL or CMOS digital circuit, to drive a large number of input gates through the use of an output stage designed with large transistors capable of sinking or sourcing a large current (i.e., a current greater than approximately 100 mA). First line driver 102 includes an output enable terminal 104, an input terminal 106, and an output terminal 108. The line drivers 102 and 122 depicted in FIG. 1 are of the non-inverting variety in which the logic signal presented at input terminals 106 and 126 are reproduced at output terminals 108 and 128 respectively. It will be appreciated, however, that inverting line drivers may be used as well. First output terminal 108 is connected to a first receiver circuit 119 while second output 128 drives a second receiver circuit 139. The inputs 106 and 126 respectively of first and second line drivers 102 and 122 may receive a signal from any address, data, or control signal requiring buffering. First and second receiver circuits 119 and 139 may comprises essentially any of a wide variety of digital circuits or components. The significant distinction between first receiver circuit 119 and second receiver circuit 139 for purposes of the invention disclosed herein is that first receiver circuit 119 is powered by a first power supply (identified as Vcc) and second receiver circuit 139 is powered by a second power supply (identified as Vccsb). It will be appreciated that although this disclosure refers to a single receiver 119 powered by Vcc and a single receiver 139 powered by Vccsb, there may be multiple such receivers. The use of multiple power supplies within a system is increasingly common in electronic circuits and components. Multiple power supplies greatly facilitate the implementation of power managed systems that can assume one of multiple power modes including a low power or standby mode that reduces power consumption during times of system inactivity. Typically, the multiple power supplies of a multiple supply system power different portions of the system. When one or more of the supplies is turned off, the power consumed by the system is reduced to the power consumed by the portions of the system that remain powered. Unfortunately, when two components or devices are connected in a multiple power supply system and the two components or devices are powered by different supplies, there is a possibility of drawing large currents when one of the portions is powered down while the other remains powered. This situation can result in improper operation, unnecessary current draw, and even destruction of system components. The present invention contemplates a circuit that addresses this problem by preventing a powered down portion of the system from drawing a large current from a preceding line driver.

Accordingly, first line drive 102 drives a first receiver circuit 119 that is powered by first power supply Vcc. Second receiver circuit 139, which is powered by second power supply Vccsb, is powered by second line driver 122. In one embodiment, first receiver circuit 119 represents a circuit, component, or device of computer system 100 that is powered on only during "full" or "normal" operation of system 100. In other words, first power supply Vcc represents a power supply that is powered on only in a fully operational power mode of the system. In a computer system, for example, first receiver circuit 119 might be suitably represented by a disk drive, display terminal, or other component that is not typically required when the system enters a low power or standby mode. On the other hand, second receiver circuit 139 is representative of a group of select circuits, device, or components, that remain powered even when system 100 enters a low power or standby mode such as a system clock, service processor, and other components that cannot or should not be disabled. Thus, second power supply Vccsb, preferably represents a standby power supply that remains powered whenever the system is on.

In the depicted embodiment, first and second line drivers 102 and 122 include output enable terminals 104 and 124 respectively. Output enable terminals on buffers and line drivers such as line drivers 102 and 122 control the output stage of the driver thereby enabling so-called tri-state outputs. Tri-state outputs are capable, as their name suggests, of assuming one of three states. In addition to being able to assume a logical high state in which the output stage of the line driver is capable of sourcing a large current, and a logical low state in which the output stage of the line driver is capable of sinking a large current, the output stage is capable of assuming a high impedance state in which the output terminal of the line driver is essentially floating and the output current is exceedingly small (i.e., less than 100 uA). In the depicted embodiment, outputs 108 and 128 are placed in the high impedance state when the corresponding output enables 104 and 124 are low. First output enable 104 is connected to output 116 of a logic block 110 referred to herein as an first output enable control circuit 110. First output enable control circuit 110 may receive input from one or more control signals 114a . . . 114n that control the state of first output enable 104. These signals enable control of first line driver 102 during normal system operation when it is desirable to tri-state the output stage of first line driver 102 even though power is present. In addition, the Vcc power supply provides an additional input 112 to first output enable control circuit 110. In the preferred embodiment, the Vcc input 112 to first output enable control circuit 110 enables the control of first output enable 104 with the Vcc power supply. Thus, the state of the first output enable 104 and, thus, the state of the output stage of first line driver 102 is a function of the Vcc power supply. In one embodiment, as depicted in the detail view of first output enable control circuit 110, power supply input 112 feeds an AND gate 113. The output of AND gate 113 is connected directly to output 116 of first output enable control circuit 110 and to first output enable 104. With this logic arrangement, it will be appreciated that first output enable 104 is low whenever the Vcc power supply level is low. Thus, when the Vcc power supply is shut off in this embodiment, output 116 of first output enable control circuit 110 is guaranteed to be low thereby driving first output enable 104 low and output 108 to a high impedance condition. Because first receiver circuit 119 is also powered by the Vcc power supply, this arrangement produces the beneficial result that the output stage of first line driver 102 is tri-stated whenever the circuit, component, or device driven by first line driver 102 is powered off. Without the guarantee of a high impedance output stage of first line driver 102, the powered down first receiver circuit 119 could produce a logic low level at input 118. If the output stage of first line driver 102 were not in a high impedance mode, the low logic level at input 118 would result in significant output current from first line driver 102. This unwanted output current would undesirably raise the standby current (referred to in this disclosure as Isb) and could potentially damage the input stage of first receiver circuit 119.

Driver circuit 100 further includes a second line driver 122 with an output 128 that drives an input 138 of a second receiver circuit 139. The output enable 124 of second line driver 122 is controlled by a second output enable control circuit 130. Second output enable control circuit 130 receives various input 134a . . . 134n, which can represent any logic signals from devices or circuit that are designed to control the state of line driver 130 in the same manner that inputs 114a . . . 114n can control the state of first line driver 102. In the depicted embodiment, second output enable control circuit 130 also receives the Vccsb power supply signal as an input 132 to second output enable control circuit. Similar to the manner in which Vcc input 112 to first output enable control circuit 110 enabled the Vcc power supply to control that state of the output stage of first line driver 102, the Vccsb input 132 can control the impedance of the output stage of second line driver 122. In embodiments, in which the Vccsb is the standby power supply voltage, it will be appreciated that is essentially unnecessary to control the output stage of second line drive by the state of the Vccsb power supply because, if the Vccsb power supply is shut off, the system is effectively turned off. Nevertheless, the depicted embodiment enables control of the second line driver 122 via the Vccsb power supply voltage. This protection may be useful if, for example, the Vccsb power supply were terminated without properly terminating the Vcc power supply. Although this situation should not occur in normal system operation, the addition of Vccsb input 132 to second output enable control circuit 130 is possible. In other embodiments, the Vccsb input 132 is omitted entirely. In either design, it will be appreciated that the state of output enable 124 of second line driver 122 is independent of the voltage level of the Vcc power supply. Because second receiver circuit 139 is powered by the Vccsb power supply, the depicted arrangement assures that output 128 of second line driver 122 is enabled whenever Vccsb power supply is on and regardless of whether the Vcc power supply is on (assuming that the control logic inputs 134a . . . 134m do not place output 128 in the tri-state condition).

The specified arrangement of driver circuit 100 thus enables the use of a method of controlling a power managed system in which the Vcc power supply voltage is detected. The first output enable 104 of first line driver 102 is then controlled by the logic level of the detected voltage. The detection of the Vcc power supply voltage is preferably achieved by using a Vcc signal itself as an input to an output enable control circuit block. In one embodiment, the control of the output stage of the first line driver 102 includes tri-stating the output stage whenever the Vcc power supply is shut off. In the preferred embodiment, the first receiver circuit 119 is powered by the Vcc power supply and the second receiver circuit is powered by the Vccsb power supply.

Figure 2:
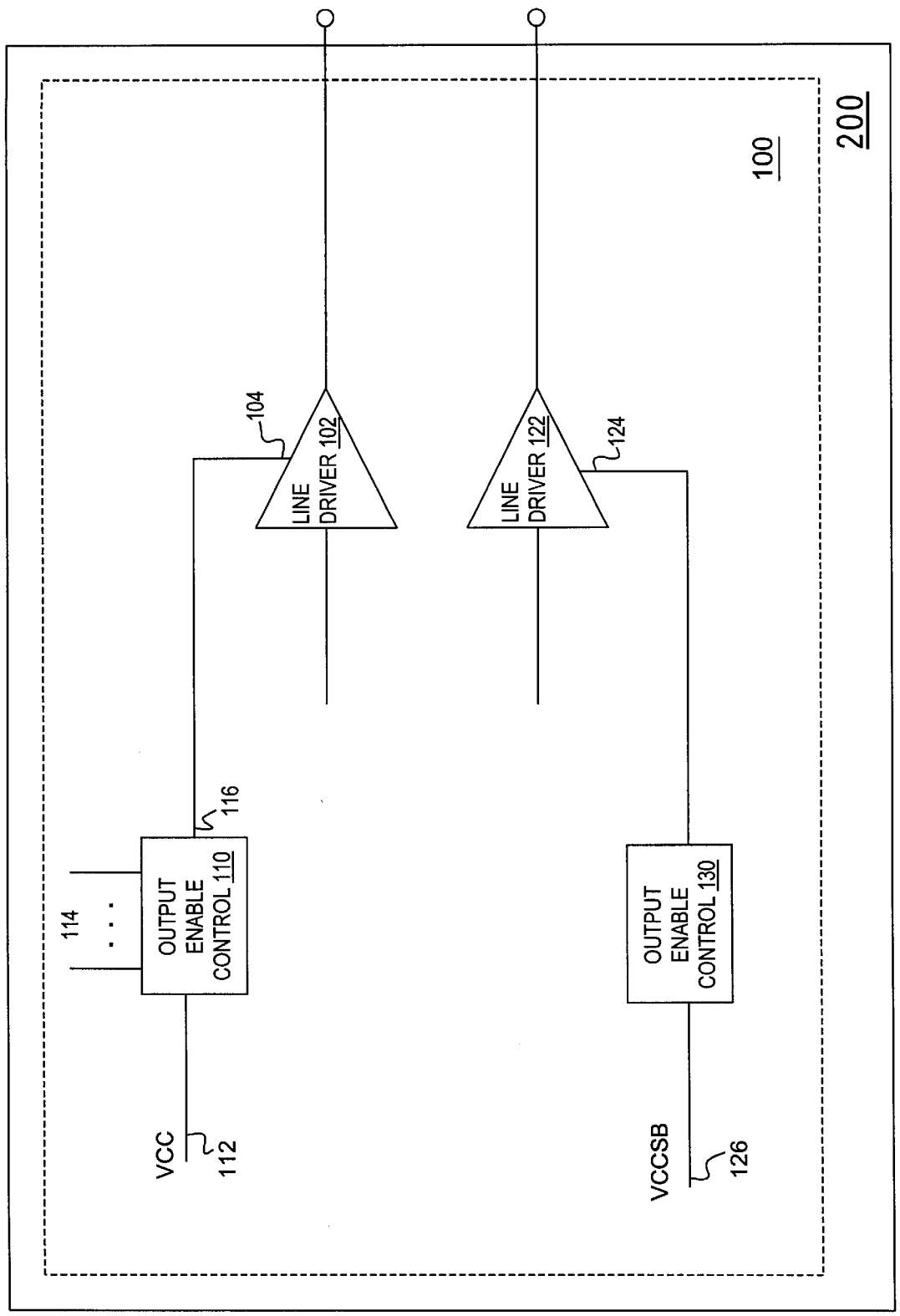
FIG. 2 is a simplified block diagram of an embodiment of the driver circuit of FIG. 1 implemented as a gate array.
Figure 3:
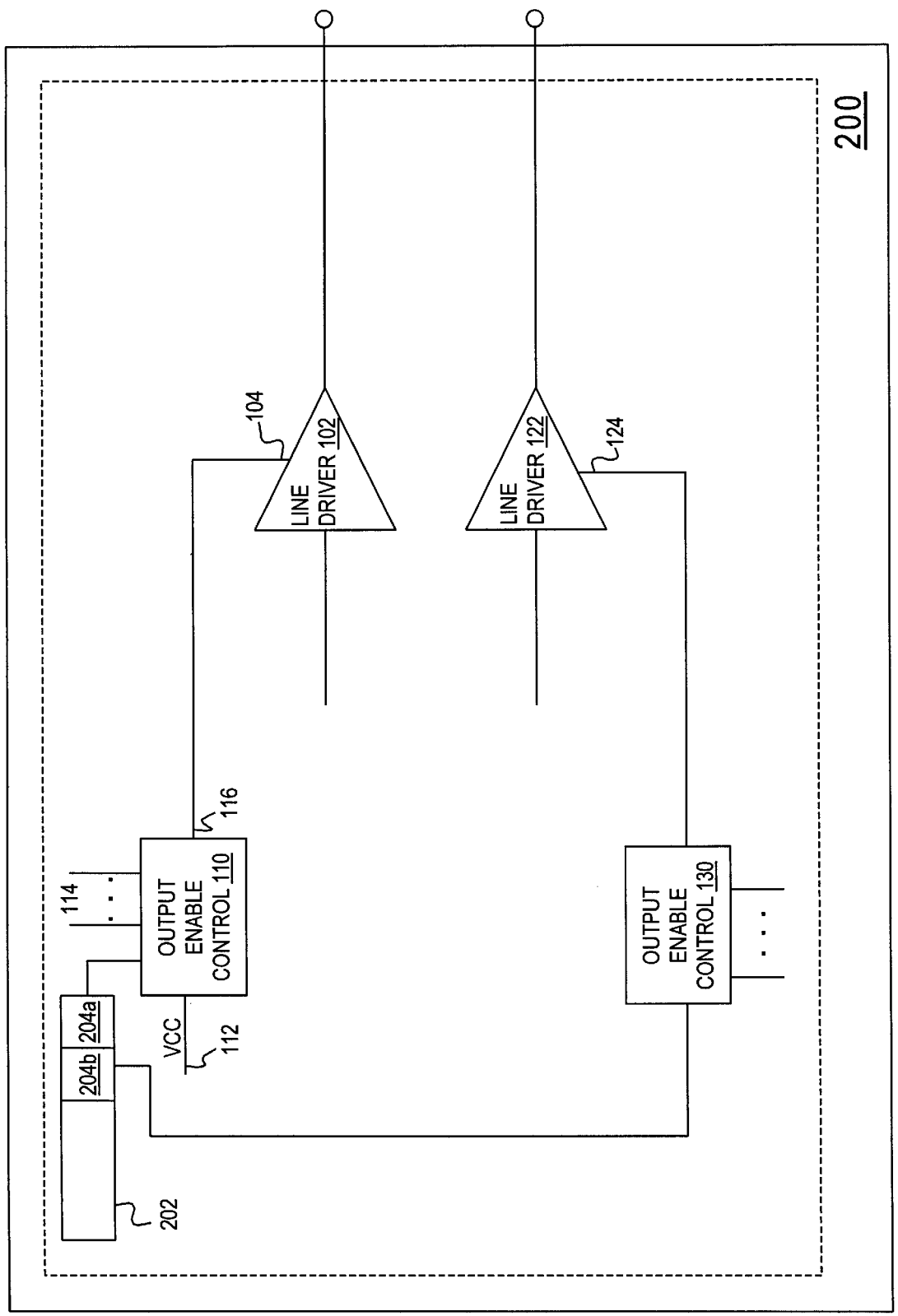
FIG. 3 is a simplified block diagram of the gate array of FIG. 2 and further including a output enable register.

Turning now to FIG. 2, an embodiment of the invention is depicted in which driver circuit 100 is incorporated within a gate array 200, preferably of the field programmable variety to provide flexibility to the design. In this embodiment, an input is added to gate array 200 to receive the Vcc signal 112 and forward signal 112 to first output enable control circuit 110. In addition, the depicted embodiment includes an optional (as discussed above) Vccsb input 126 as an input to second output enable control circuit 130. Gate array 200 may be suitably integrated into the motherboard of a computer system or implemented in a peripheral adapter card that plugs into a bus, such as the ISA bus, of the computer system to provide the system with general purpose or special purpose output signals. Gate array 200 can further incorporate the logic embedded in output enable control circuits 114 and 134. The use of a gate array provides a low cost solution to the implementation of driver circuit 100 into a computer or other power managed system. Turning to FIG. 3, an embodiment of gate array 200 is presented that includes an output enable register 202. Output enable register 202, in the preferred embodiment, includes bits 204a . . . 204n corresponding to each line driver on gate array 200. The programmable bits 204, in one embodiment, enable the system to determine which of the line drivers will be tri-stated when a power supply such as Vcc is turned off. In one embodiment, register bits 204 default to the output enable state upon system power up. In another embodiment, the registers default to the output tri-state condition. In either embodiment, register 204 are preferably programmed early in the start up sequence. In another embodiment, Referring to FIG. 4, an embodiment is depicted in which Vcc signal 112 and output enable register bit 204a are input to an OR gate 205. The output of OR gate 205 is routed to an AND gate 113. Thus, by programming output enable register bit 204a to "1", the output 116 of first output enable control circuit 110 is made independent of Vcc signal 112. This arrangement can be repeated for each line driver in programmable gate array 200 to achieve an embodiment of the invention a user can fully program which of the line drivers are tri-stated when Vcc is turned off.

Figure 4:
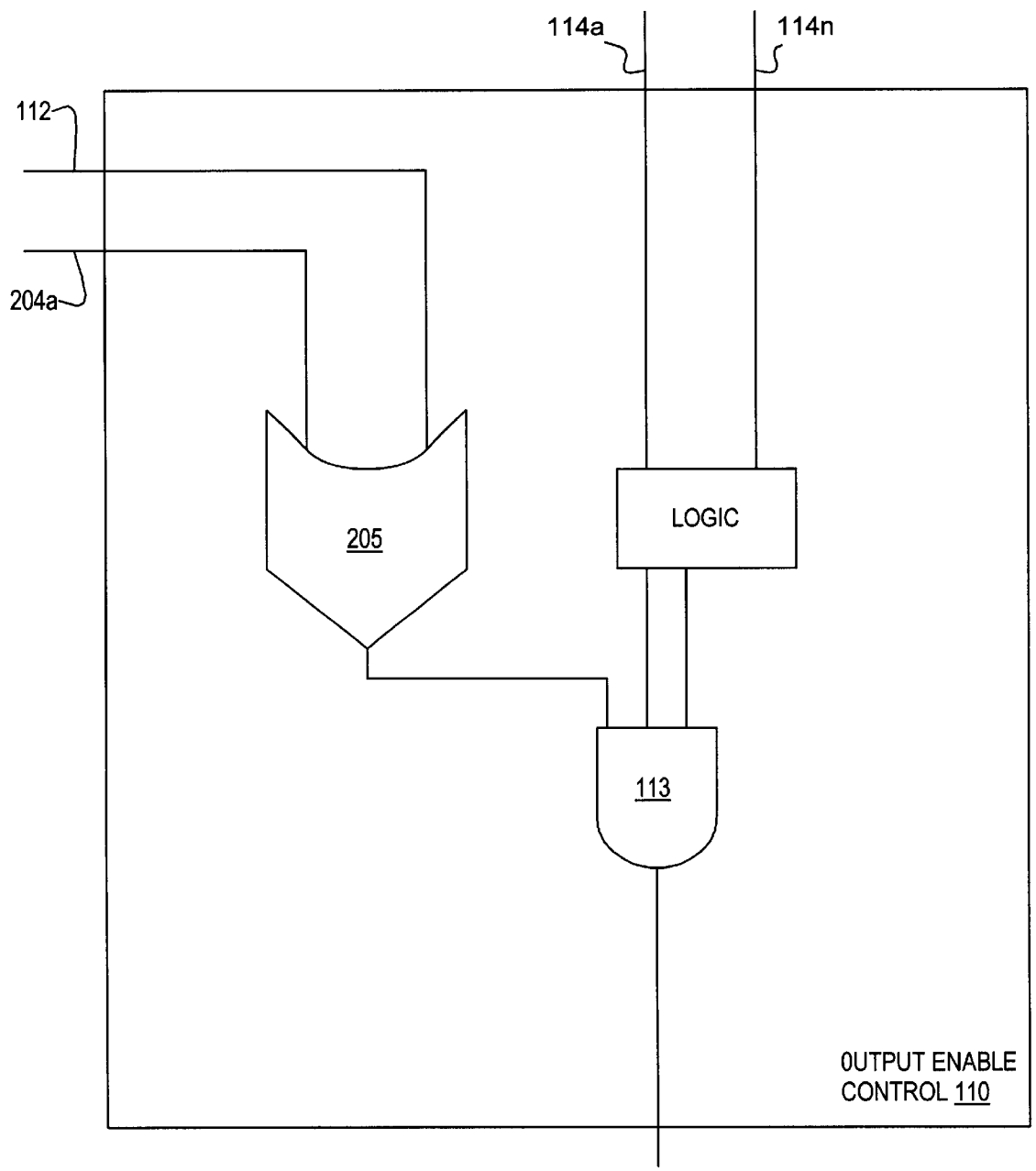
FIG. 4 is a logic diagram of an output enable circuit of the gate array of FIG. 3.
Figure 5:
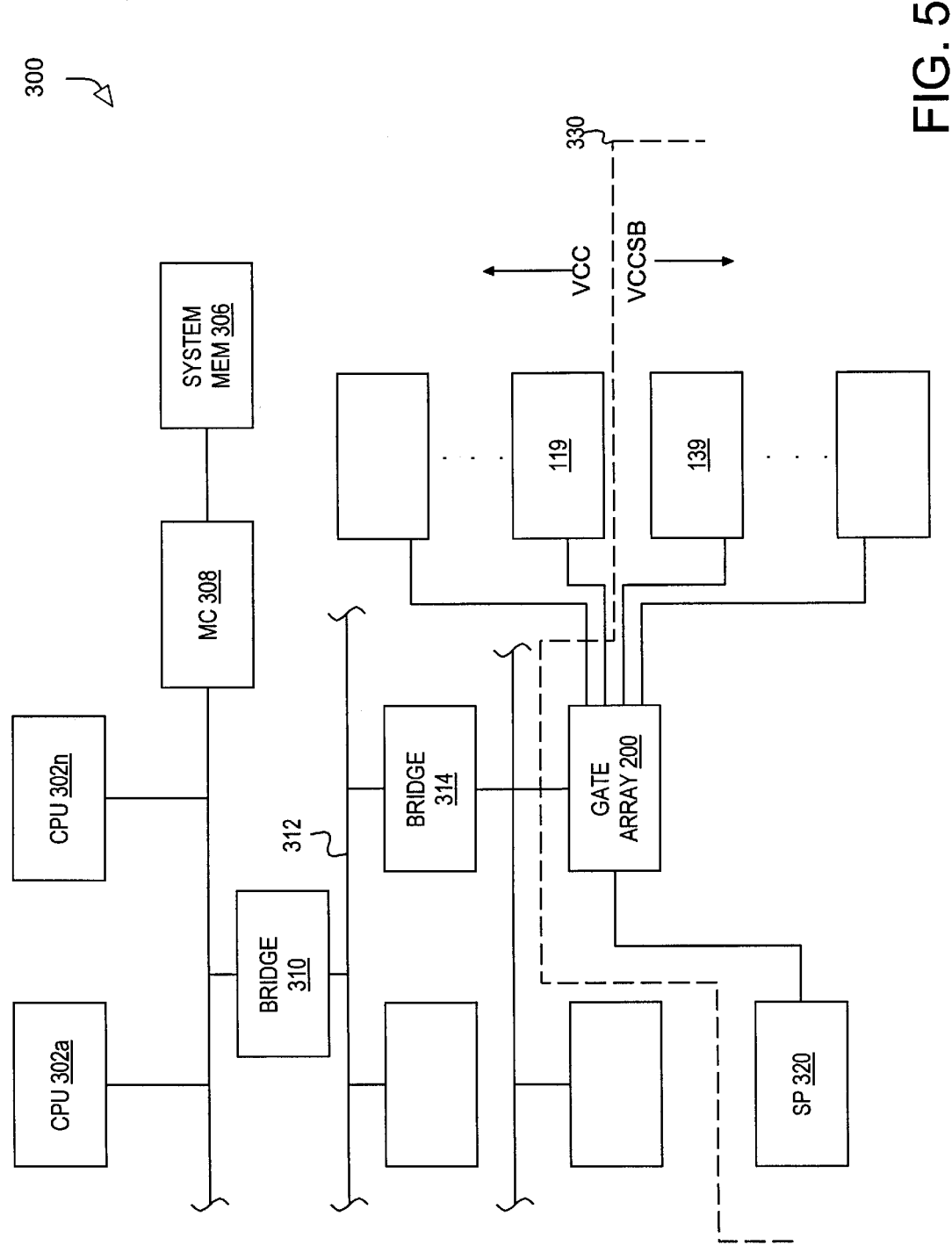
FIG. 5 is a simplified block diagram of a computer system according to the present invention.

Turning now to FIG. 5, one embodiment of a computer system 300 according to the present invention is depicted. Computer system 300 includes a set of central processors (CPUs) 302a . . . 302n that are connected to a host bus 304. A system memory 306 is accessible from the host bus 304 via memory controller 308. A first bus bridge 310 is coupled between host bus 304 and a first peripheral bus 312, such as a PCI bus. A second bridge 314 is connected between the fist peripheral bus 312 and a second peripheral bus, such as an ISA bus 316. A gate array 200, as described with respect to FIGS. 2, 3, and 4 above is coupled to the second peripheral bus 316 such that gate array 200 is accessible to the CPUs 302 (and other devices on the peripheral busses 312 and 316). In the preferred embodiment, system 300 may further include a service processor 320 that is coupled to gate array 200 via a suitable service processor bus such as a Motorola 68000 type bus. Service processor 320 provides a mechanism for controlling various facilities of computer system 300 when the system enters standby mode and during system startup. (Service processor 320 may also control or monitor various environmental facilities such as the system fans, etc.). When Vccsb is first applied after a power on event, service processor 320, which is powered by Vccsb in the preferred embodiment, initializes the output enable register 202 (shown in FIG. 3) of gate array 200 depending upon which of the line drivers service processor 200 wants to enter tri-state condition when the system enters standby mode. FIG. 5 includes an indicator 330 of the portions of system 300 powered by Vcc and the portions powered by Vccsb. The line drivers associated with appropriately programmed bits 204 of output enable register 202 (bits programmed to "0" as shown in FIGS. 3 and 4) will immediately enter tri-state condition until Vcc is applied. The line drivers associated with the remaining bits 204 of output enable register 202 are enabled as soon as Vccsb is applied. In the preferred embodiment, line drivers that drive receivers that operate in standby mode will be enabled regardless of the presence of Vcc and line drivers that drive receivers that operate in full power mode only will be dependent upon the presence of Vcc.

It will be apparent to those skilled in the art having the benefit of this disclosure that the present invention contemplates a circuit and method for controlling line drivers in an electronic system and thereby managing power consumption. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A driver circuit for use in a power managed system comprising first and second power supplies, the circuit comprising:
    a first line driver, wherein an output of the first line driver is connected to a first receiver circuit and further wherein the first line driver is a tri-state driver;
    a second line driver, wherein an output of the second line driver is connected to a second receiver circuit;
    a first output enable control circuit connected to an output enable terminal of the first line driver, wherein the first power supply provides an input to the first output enable control circuit and the first output enable control circuit is configured to force the output of the first line driver to a high impedance state responsive to the first power supply; and
    an output enable register wherein each bit in the output enable register corresponds to a respective line driver and further wherein the state of each line driver's output is a function of the corresponding output enable register bit.

2. The circuit of claim 1, wherein the first power supply is the Vcc power supply of the system and the second power supply is the Vccsb of the system.

3. The circuit of claim 1, wherein the output of the first line driver assumes a high impedance state when the first power supply is off.

4. The circuit of claim 1, further comprising a second output enable control circuit connected to an output enable terminal of the second line driver, wherein the second power supply provides an input to the second output enable control circuit and the second output enable control circuit is configured to force the output of the second line driver to the high impedance state responsive to the second power supply.

5. The circuit of claim 1, wherein the output enable register bits determine whether the state of the corresponding output enable is a function of the first power supply.

6. A driver circuit for use in a power managed system comprising first and second power supplies, the circuit comprising:
    a first line driver, wherein the first line driver is a tri-state driver and an output of the first line driver is connected to a first receiver circuit;
    a second line driver, wherein an output of the second line driver is connected to a second receiver circuit;
    a first output enable control circuit connected to an output enable terminal of the first line driver, wherein the first power supply provides an input to the first output enable control circuit and the first output enable control circuit is configured to force the output of the first line driver to a high impedance state if the first power supply is off; and
    an output enable register wherein each bit in the output enable register corresponds to a respective line driver and further wherein the state of each line driver's output is a function of the corresponding output enable register bit;
    wherein the first receiver circuit is powered by the first power supply such that the first line deliver is forced to a high impedance state if power to the first receiver circuit is off.

7. A computer system, comprising:
    first and second power supplies;
    a CPU connected to a host bus;
    a bus bridge coupled between the host bus and a peripheral bus; and
    a driver circuit accessible from peripheral bus;
    wherein the driver circuit comprises:
        a first line driver, wherein an output of the first line driver is connected to a first receiver circuit and further wherein the first line driver is a tri-state driver;
        a second line driver, wherein an output of the second line driver is connected to a second receiver circuit;
        a first output enable control circuit connected to an output enable terminal of the first line driver, wherein the first power supply provides an input to the first output enable control circuit and the first output enable control circuit is configured to force the output of the first line driver to a high impedance state responsive to the first power supply; and
        an output enable register wherein each bit in the output enable register corresponds to a respective line driver and further wherein the state of each line driver's output is a function of the corresponding output enable register bit.

8. The system of claim 7, wherein the first power supply is the Vcc power supply of the system and the second power supply is the Vccsb of the system.

9. The system of claim 7, wherein the output of the first line driver assumes a high impedance state when the first power supply is off.

10. The system of claim 7, further comprising a second output enable control circuit connected to an output enable terminal of the second line driver, wherein the second power supply provides an input to the second output enable control circuit and the second output enable control circuit is configured to force the output of the second line driver to the high impedance state responsive to the second power supply.

11. The system of claim 7, wherein the output enable register bits determine whether the state of the corresponding output enable is a function of the first power supply.

12. The system of claim 7, further comprising a service processor powered by a Vccsb of the system, wherein the service processor is coupled to the driver circuit.

13. A computer system comprising:
    first and second power supplies;
    a CPU connected to a host bus;
    a bus bridge coupled between the host bus and a peripheral bus; and a driver circuit accessible from peripheral bus;
wherein the driver circuit comprises:
- a first line driver, wherein an output of the first line driver is connected to a first receiver circuit and further wherein the first line driver is a tri-state driver,
- a second line driver, wherein an output of the second line driver is connected to a second receiver circuit;
a first output enable control circuit connected to an output enable terminal of the first line driver, wherein the first power supply provides an input to the first output enable control circuit and the first output enable control circuit is configured to force the output of the first line driver to a high impedance state if the first power supply is off; and
   an output enable register wherein each bit in the output enable register corresponds to a respective line driver and further wherein the state of each line driver's output is a function of the corresponding output enable register bit;
   wherein the first receiver circuit is powered by the first power supply such that the first line driver is forced to a high impedance state if power to the first receiver circuit is off.

14. A control method for use in a power managed system, comprising:
   detecting that a Vcc power supply of the system is off and that a Vccsb power supply of the system is on;
   responsive to detecting the Vcc power supply, tri-stating an output of a first line driver by clearing a first bit in an output enable register, wherein an output of the first line driver is connected to a first receiver circuit powered by the Vcc power supply; and
   responsive to detecting the Vccsb power supply, enabling an output of a second line driver by setting a second bit in an output enable register, wherein an output of the second line driver is connected to a second receiver circuit powered by the Vccsb power supply.

15. The method of claim 14, wherein detecting the voltage of the Vcc power supply comprises routing the Vcc power supply to the input of a first output enable control circuit.

* * * * *

UNITED STATES PATENT AND TRADEMARK OFFICE
CERTIFICATE OF CORRECTION

PATENT NO.    : 6,262,605 B1                                             Page 1 of 1
DATED         : July 17, 2001
INVENTOR(S)   : Yi-Ming Ku It is certified that error appears in the above-identified patent and that said Letters Patent is hereby corrected as shown below:

<u>Column 7,</u>
Beginning at line 59, should read --
6.   A driver circuit for use in a power managed system comprising first and second power supplies, the circuit comprising:

a first line driver, wherein the first line driver is a tri-state driver and an output of the first line driver is connected to a first receiver circuit;

a second line driver, wherein an output of the second line driver is connected to a second receiver circuit;

a first output enable control circuit connected to an output enable terminal of the first line driver, wherein the frist power supply provides an input to the first output enable control circuit and the first output enable control circuit is configured to force the output of the first line driver to a high impedance state if the first power supply is off;

an output enable register wherein each bit in the output enable register corresponds to a respective line driver and further wherein the state of each line driver's output is a function of the corresponding output enable register bit; and wherein the first receiver circuit is powered by the first power supply such that the first line driver is forced to a high impedance state if power to the first receiver circuit is off. --

Signed and Sealed this

Second Day of July, 2002

*Attest:*

*Attesting Officer*

JAMES E. ROGAN
*Director of the United States Patent and Trademark Office*